Jan. 28, 1969   J. W. MURDOCK   3,424,191
SYSTEM FOR REGULATING VISCOSITY OF LIQUIDS
Filed Sept. 29, 1966
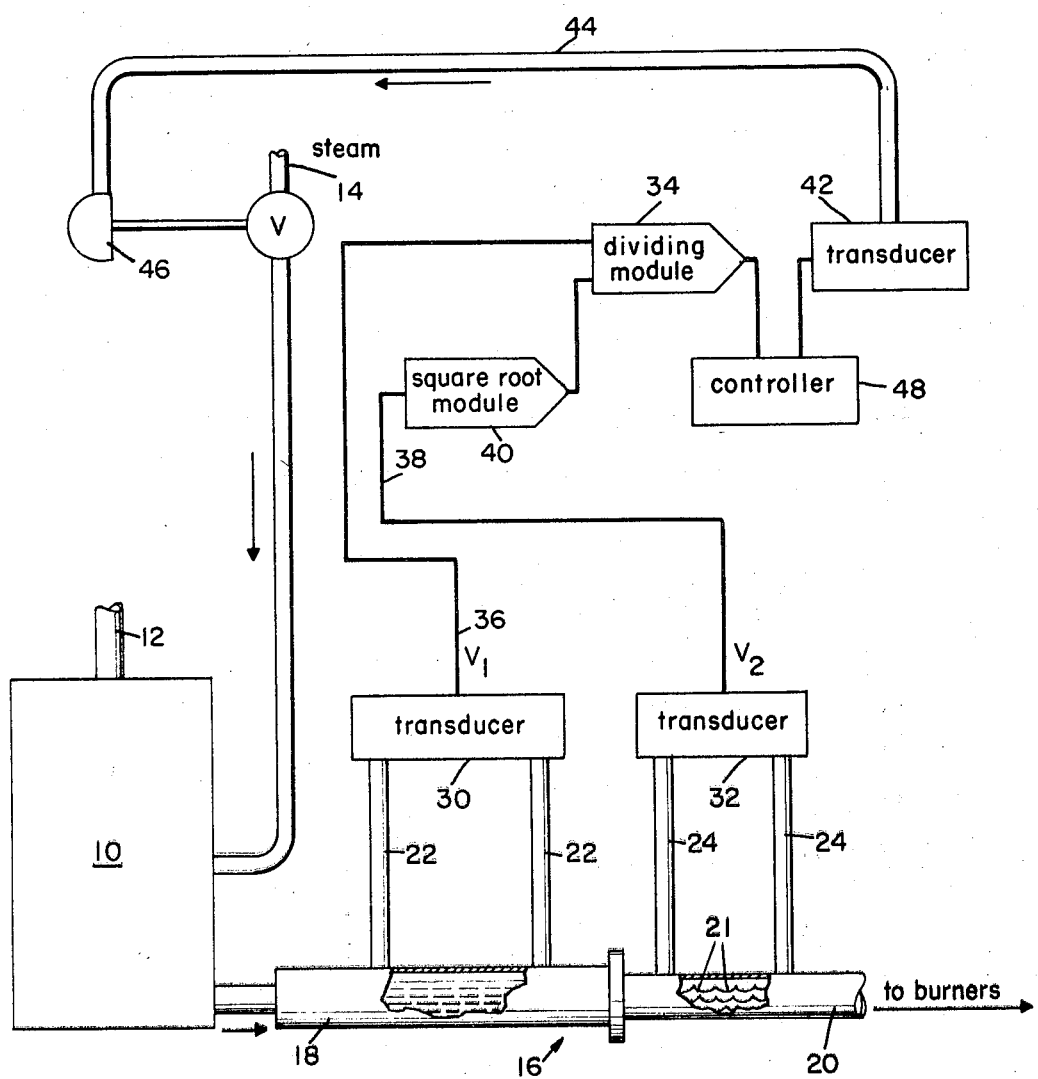
INVENTOR.
JAMES W. MURDOCK
BY
*J. J. Sheehan*
ATTORNEY

United States Patent Office 3,424,191
Patented Jan. 28, 1969

1

3,424,191
SYSTEM FOR REGULATING VISCOSITY OF LIQUIDS
James W. Murdock, Springfield, Pa., assignor to the United States of America as represented by the Secretary of the Navy
Filed Sept. 29, 1966, Ser. No. 583,510
U.S. Cl. 137—334          5 Claims
Int. Cl. G05d 24/02; F82c 3/08

The invention described herein may be manufactured and used by or for the Government of the United States of America for governmental purposes without the payment of any royalties thereon or therefor.

This invention relates to apparatus or system for regulating the viscosity of liquids and in particular is concerned with a system whereby the viscosity of a high viscosity liquid such as a fuel oil can be maintained at optimum viscosity to provide for the efficient combustion of the fuel oil.

It is well known that the viscosity of fluid can be determined by instrumentation for measuring the differential in pressure of the fluid when the flow-rate and flow-temperature are kept constant. However, a fluid of high viscosity such as fuel oil tends to adhere to the interior of the walls of conduits as it flows therethrough and renders an inaccurate reading on the instrumentation. This is for the reason that the reading is not based on a constant flow rate but is affected by the turbulent flow through the conduits which is caused by the adherent oil.

The present invention is predicated on this observed phenomenon and is directed to the incorporation in a system of apparatus for indicating the differential pressure of the laminar flow of the fuel oil in one zone of the system and the incorporation of apparatus for indicating the differential pressure of turbulent flow of oil in another zone of the system. The invention further contemplates utilizing these differential pressures to control the temperature and hence the viscosity of the fuel oil and provide optimum viscosity for efficient combustion of the fuel oil in the burners, for example, of naval vessels.

An object of this invention is to provide a system for regulating the viscosity of fuel oil in accordance with the pressure difference existing in different zones of the system as the fuel oil passes therethrough.

Another object of this invention is to control the viscosity of the fuel oil in accordance with both the differential pressure based on laminar flow and the differential pressure based on turbulent flow and provide optimum viscosity for efficient combustion.

Other objects, advantages and novel features of the invention will become apparent from the following detailed description of the invention when considered in conjunction with the accompanying drawings, wherein:

The single figure of the drawing shows the invention applied to fuel oil storage equipment on shipboard and is generally a schematic diagram with portions broken away to show details.

Referring to the drawing, at 10 is indicated a storage tank to which fuel oil is supplied by line 12, heated by a steam supply through line 14, and transmitted by conduit assembly 16 to the oil burners (not shown) for combustion.

The conduit assembly 16 provides a first zone 18 wherein the oil will effect a laminar flow and a second zone 20 wherein the oil will effect a turbulent flow. For this purpose, as shown, the inner surface of the first zone 18 is smooth while the inner surface of the second zone is interrupted, for example, by using some type of baffle means or, as shown, by providing protuberances 21 on the inner surface. It is considered for proper operation

2 that a dimensional or size relationship exist between the zones 18 and 20 in order to accentuate the pressure drop of the fuel oil as it flows through the zones. For example, if the laminar zone 18 is two inches in diameter and four feet in length, the turbulent zone should be approximately one inch in diameter and two feet in length or approximately one-half the diameter and length of the laminar zone. The zones 18 and 20 are each provided with a pair of pressure transmitting conduits shown respectively at 22, 22 for zone 18 and 24, 24 for zone 20. These are located generally at the inlet and outlet ends of the zones. A pressure difference exists between the inlet and the outlet of the laminar zone and another pressure difference exists between the inlet and outlet of the turbulent zone and these pressure differences are used to regulate the steam supply to the storage tank 10.

An assembly of commercially available equipment is provided for this purpose which is considered the most practical for shipboard use, however, other readily obtainable equipment could be used in carrying out the invention. The present equipment consists of a first transducer 30 which is connected to the tubes 22, 22 and a second transducer 32 which is connected to the tubes 24, 24. The transducers may, for example, be of the diaphragm type to be operative by the pressure differences existing between the inlets and outlets of the zones 18 and 20 which is applied to the transducers by the conduits 22, 22 and 24, 24. The function of the transducers is to provide output voltages which are proportional to the pressure differences and these voltages are represented at $V_1$ for the laminar zone 18 and at $V_2$ for the turbulent zone 20.

The voltages $V_1$ and $V_2$ are directed to an electrical analog module 34 through conductors 36 and 38, respectively. The voltage $V_1$ is a linear function of the laminar zone 18 and is transmitted directly to the module 34 while the voltage $V_2$ is the square root function of the turbulent zone 20 and requires the use of another analog or extracting module 40 which is interposed in conductor 38. The electrical analog module 34 is operative to divide the voltages transmitted thereto and to provide a voltage signal for operating a second transducer 42 which is operative to provide output pressure. The pressure is then transmitted through tubing 44 to a diaphragm valve 46 for regulating the steam supply through line 14 for heating the oil in storage tank 10. In order to insure operation of the valve 46 and maintain the fuel oil in tank 10 at a predetermined viscosity a controller 48 is interposed between the module 34 and the transducer 42 which will be set to maintain the tank 10 at proper temperature to provide oil of the predetermined desired viscosity.

Obviously, many modifications and variations of the present invention are possible in the light of the above teachings. It is therefore to be understood that, within the scope of the appended claims, the invention may be practiced otherwise than as specifically described.

I claim:
1. A system for regulating the viscosity of fuel oil to provide efficient combustion which comprises,
   (a) a fuel oil storage unit having valve controlled heating means,
   (b) a conduit assembly for connecting said fuel storage unit with combustion apparatus,
   (c) said conduit assembly having a first zone for laminar flow of the fuel oil between its inlet and outlet and a second zone for turbulent flow of the fuel oil between its inlet and outlet,
   (d) a first transducer operative by differential pressure existing between the inlet and outlet of said first zone to provide a first output voltage and a second transducer operative by differential pressure existing between the inlet and outlet of said second zone to provide a second output voltage and (e) an analog module operative by said first and second output voltages for producing a signal voltage to operate the valve controlled heating means.

2. A system for regulating the viscosity of fuel oil as set forth in claim 1, further characterized by a first pair of pressure transmitting tubes connecting the inlet and outlet of said first zone of the conduit assembly with said first transducer and a second pair of pressure transmitting tubes connecting the inlet and outlet of said second zone of the conduit assembly with said second transducer.

3. A system for regulating the viscosity of fuel oil as set forth in claim 1, further characterized by a first conductor between said first transducer and the analog module and a second conductor between the second transducer and the analog module and said second conductor having a square root module therein.

4. A system for regulating the viscosity of fuel oil as set forth in claim 1, further characterized by the fuel storage unit having a pressure valve controlling the heating means and a pressure transducer and pressure line in series between the analog module and the pressure valve.

5. A system for regulating the viscosity of fuel oil as set forth in claim 4, further characterized by a controller between the analog module and the pressure transducer which is operative to supply a predetermined pressure to said pressure valve for maintaining the fuel oil at a desired viscosity.

References Cited

UNITED STATES PATENTS

| | | | |
|---|---|---|---|
| 2,452,142 | 10/1948 | Pecker | 137—92 XR |
| 2,042,860 | 6/1936 | Peabody et al. | 137—92 XR |
| 3,277,916 | 10/1966 | Deming | 137—92 |
| 3,344,799 | 10/1967 | Hardin | 137—92 |
| 3,249,115 | 5/1966 | Young | 137—92 |
| 3,380,463 | 4/1968 | Trethewey | 137—4 |

SAMUEL SCOTT, *Primary Examiner.*

U.S. Cl. X.R.

137—92